US008874649B2

(12) United States Patent
Chen et al.

(10) Patent No.: US 8,874,649 B2
(45) Date of Patent: *Oct. 28, 2014

(54) DETERMINATION OF A SPAMMER THROUGH SOCIAL NETWORK CHARACTERIZATION

(75) Inventors: Xiao Yan Chen, Beijing (CN); Lei Shi, Beijing (CN); Chen Wang, Beijing (CN); Yi Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/531,774

(22) Filed: Jun. 25, 2012

(65) Prior Publication Data

US 2013/0007151 A1 Jan. 3, 2013

Related U.S. Application Data

(63) Continuation of application No. 13/527,748, filed on Jun. 20, 2012.

(30) Foreign Application Priority Data

Jun. 30, 2011 (CN) .......................... 2011 1 0182348

(51) Int. Cl.
G06F 15/16 (2006.01)
(52) U.S. Cl.
USPC ............................ 709/204; 709/223; 709/224
(58) Field of Classification Search
CPC .... H04L 51/12; H04L 12/585; H04L 63/1408
USPC ........................................ 709/204, 223, 224
See application file for complete search history.

(56) References Cited

U.S. PATENT DOCUMENTS

| 7,155,243 | B2 | 12/2006 | Baldwin et al. | |
|---|---|---|---|---|
| 7,640,030 | B2 | 12/2009 | Cai et al. | |
| 7,729,710 | B2 | 6/2010 | Jie et al. | |
| 7,937,468 | B2 * | 5/2011 | Libbey et al. | 709/225 |
| 2008/0140781 | A1 | 6/2008 | Bocharov et al. | |
| 2009/0216841 | A1 * | 8/2009 | Choi et al. | 709/206 |
| 2012/0030293 | A1 * | 2/2012 | Bobotek | 709/206 |

FOREIGN PATENT DOCUMENTS

CN 101686444 A 3/2010

OTHER PUBLICATIONS

Wang et al. "A Behavior-Based SMS Antispam System," IBM J. Res. and Dev., vol. 54, No. 6, Paper 3. pp. 1-16. Nov. 2010.*
M. Zubair Rafique, et al., "SMS Spam Detection by Operating on Byte-Level Distribution Using Hidden Markov Models (HMMS)," Virus Bullentin Conference, pp. 1-7, Sep. 2010.
C. Wang, et al., A Behavior-Based SMS Antispam System, IBM J. Res. and Dev., vol. 54, No. 6, Paper 3, pp. 1-16; 2010.
Sarita Yardi, et al, "Detecting Spam in a Twitter Network," First Monday, vol. 15, No. 1-4, pp. 1-12, Jan. 2010.
Ji Won Yoon, et al "Hybrid Spam Filtering for Mobile Communication," Elsevier, Computers and Security 29, pp. 446-459, 2010.

* cited by examiner

*Primary Examiner* — Nicholas Taylor
(74) *Attorney, Agent, or Firm* — Cantor Colburn LLP

(57) ABSTRACT

A system for determining a spammer includes a session division apparatus configured to acquire short message events associated with a user and divide them into a plurality of sessions in terms of time; a social network building and characteristic calculating apparatus configured to build a social network of the user in each of the sessions, and calculate at least one type of social network characteristic in each of the sessions, respectively; and a determination apparatus configured to determine whether the user is a spammer or not according to the social network characteristic.

5 Claims, 5 Drawing Sheets

DETERMINATION OF A SPAMMER THROUGH SOCIAL NETWORK CHARACTERIZATION

PRIORITY

This application is a continuation of U.S. patent application Ser. No. 13/527,748, filed Jun. 20, 2012, which in turn claims priority to Chinese Patent Application No. 201110182348.3, filed 30 Jun. 2011, and all the benefits accruing therefrom under 35 U.S.C. §119, the contents of which in its entirety are herein incorporated by reference.

BACKGROUND

The present disclosure relates generally to the determination of a spammer, and in particular, to a method and apparatus for determining a spammer with increased accuracy.

Spam short messages are defined as a bulk of messages with illegal or advertising content sent to telecommunication terminal users, whose mobile phone numbers are within a fixed range of numbers or acquired abnormally, from specific organizations/individuals.

Presently, approximately 80% of individuals have experienced receiving spam short messages. Spam short messages are becoming more problematic with respect to the daily lives of ordinary mobile phone users. Without a useful solution to solve this problem, that is, an effective way to detect the numbers sending spam short messages, every mobile device could conceivably be flooded with spam messages such that users will have difficulty obtaining useful information from their devices. Another area of concern is that spammers may hold a large amount of personal information of mobile phone users, which leads to privacy security issues for customers. On the other hand, spammers may attempt to illegally use telecommunication service tariff packages that provide low telecommunication service prices, thereby significantly affecting revenue of the telecommunication operators.

SUMMARY

According to one aspect, a system for determining a spammer includes a session division apparatus configured to acquire short message events associated with a user and divide them into a plurality of sessions in terms of time; a social network building and characteristic calculating apparatus configured to build a social network of the user in each of the sessions, and calculate at least one type of social network characteristic in each of the sessions, respectively; and a determination apparatus configured to determine whether the user is a spammer or not according to the social network characteristic.

BRIEF DESCRIPTION OF THE SEVERAL VIEWS OF THE DRAWINGS

Referring to the exemplary drawings wherein like elements are numbered alike in the several Figures.

DETAILED DESCRIPTION

The embodiments of the present invention are described in the following with reference to the figures. In the following description, lots of specific details are described so as to make the invention better understood. However, it is apparent to the skilled in the art that some of these specific details are not necessary in the implementation of the invention. In addition, it should be understood that the invention is not limited to the particular embodiments introduced. To the contrary, it is conceivable to implement the invention by arbitrarily combining the following features and elements, whether or not they are involved in different embodiments. Therefore, the following aspects, features, embodiments and advantages are only for illustration, but should not be considered as elements of the appended claims or limitations to them, unless otherwise stated explicitly in the claims.

Although there exist several technologies to detect a spammer in the prior art, none of them can meet the requirements of users simultaneously in terms of accuracy and recall. Among them, a social network based technology for detecting spam short messages is relatively effective. The social network based technology for detecting spam short messages in the prior art determines a spammer by analyzing social network characteristics of a short message sender from a static social network. However, the prior art techniques cannot effectively identify those hybrid spammers having both normal and spam short message sending behaviors, because the behaviors of these hybrid spammers appears normal in a static social network.

If normal users are misjudged as spammers, and their numbers are locked, then economical loss will result for operators. Therefore, there still exists room for improvement in the prior art. With a technical solution of the embodiments, it is possible to improve the accuracy of determining a spammer, and in particular identifying a hybrid spammer to some extent.

Figure 1:
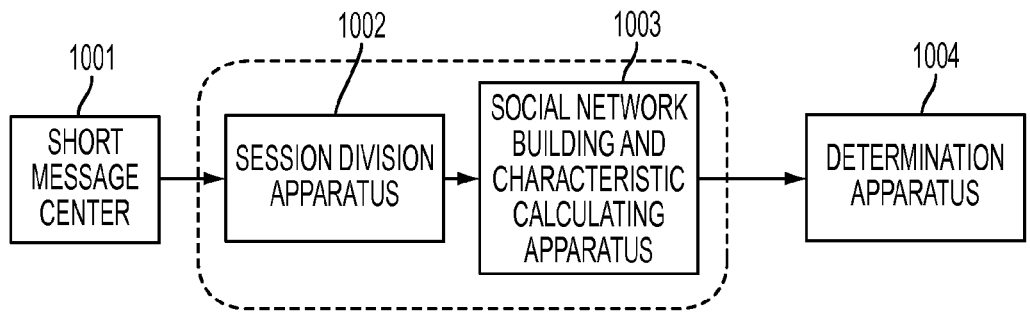
FIG. 1 shows a system for determining a spammer in accordance with an exemplary embodiment.

Referring initially to FIG. 1, a system for determining a spammer is shown. The system includes a short message center 1001 for providing information of short message events, wherein, for example, the short message events can be provided by using a detailed record of short message, and a typical detailed record of short message includes information of the sender of a short message, the receiver of a short message, the registration time of a short message, the sending time of a short message, the content of a short message, and the length of a short message, etc. A session division apparatus 1002 is configured to receive short message events from the short message center, to acquire short message events associated with a certain user, and to divide them into a plurality of sessions in terms of time, wherein, in one embodiment, according to the sending behaviors of the user, it can be divided into a bulk session with a bulk behavior and a normal session with a normal sending behavior. A social network building and characteristic calculating apparatus 1003 is configured to build a social network of the user in each of the sessions and to calculate at least one type of social network characteristic in the respective sessions. A determination apparatus 1004 is configured to determine whether the user is a spammer or not based on the social network characteristic.

An exemplary workflow for each apparatus in the system shown in FIG. 1 will be described in conjunction with the following additional figures.

Figure 2:
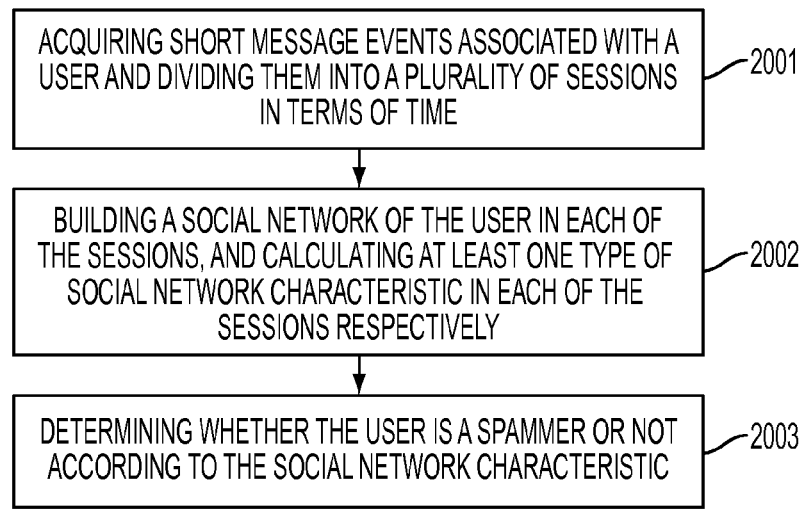
FIG. 2 shows a work flow for determining a spammer based on a social network.

Referring now to FIG. 2, there is shown an exemplary workflow for determining a spammer based on a social network, which can be applied by the computer system shown in FIG. 1. At block 2001, information of short message events is received from a short message center, and short message events associated with a certain user are acquired and divided into a plurality of sessions in terms of time.

In a first implementation, the division of sessions can be conducted according to a pre-fixed way, which is a static division. For example, the division is conducted according to a fixed time interval, or sessions with different time lengths are obtained by dividing according to different days or different time periods of the same day. On the basis of the information disclosed by the present application, adjustment of the division of sessions can be performed by those skilled in the art according to their experiences.

In a second implementation, the plurality of sessions is obtained by dividing according to the sending behaviors of the user, wherein the plurality of sessions includes bulk sessions and normal sessions. The bulk session is the duration of the behavior of sending short messages in bulk by the user, and the normal session is the duration of the behavior of normally sending short messages by the user. Therefore, it is an implementation of performing dynamic division according to whether a behavior of a short message sender is bulk or normal. Since characteristics of users' sending behaviors is considered in the way of session division, the accuracy of recognition is further improved, compared to the first implementation.

In particular, obtaining bulk sessions and normal sessions by dividing according to users' sending behaviors includes: in response to the rate of sending short messages by the user exceeding a preset rate r, marking a start of the bulk sessions, and then, in response to the rate of sending short messages by the user being lower than the preset rate r, marking an end of the bulk sessions; the normal sessions are partial periods between the adjacent bulk sessions. The preset rate r can be the number of messages sent to different receivers within a unit time.

In an embodiment, the division of bulk sessions can detect the start of a bulk behavior and the end of a bulk behavior from a stream of short message events, and determine the start of a bulk session based on the emergence of a traffic burst of short message events. The emergence of a traffic burst can reflect that the rate of sending short messages by the user exceeds the preset rate r. Therefore, in response to the rate of sending short messages by the user exceeding the preset rate r, the start of the bulk session is marked, and then, in response to the rate of sending short messages by the user being lower than the preset rate r, the end of the bulk session is marked; the normal sessions are partial periods between the adjacent bulk sessions. Wherein, the preset rate r can be set by those skilled in the art based on their experiences.

In particular, specific embodiments such as a sliding window or a token bucket can be used, and further description is provided in the following.

In a third implementation, the dynamic division of bulk sessions can be performed by using the similarity of sending behaviors. For example, there usually are similar sending intervals in a bulk session, while the sending intervals vary a lot and have no similarity during a normal session.

Referring again to FIG. 2, at block 2002, a social network of the user in each of the sessions is built, and at least one type of social network characteristic in the respective sessions is calculated respectively.

A telecommunication social network can be built by using an existing technique. The telecommunication social network of each session is a directional diagram configured by all short message records between a user, i.e., a central node, and its direct contacts. The social network can be one-hop social network, two-hop social network, or even more-hop social network, as is described in Chinese patent publication CN101686444A.

It is noted that the social network characteristic recorded in CN101686444A is only the characteristic extracted from a static social network, and the information in the evolvement course of the social network is hidden. Therefore, it has limitations and may lead to an incorrect determination of spammers. However, in the present application, the social network characteristics of each session are calculated. The segmented calculation can reflect the evolvement course of a social network, and further improve the accuracy of determining a spammer.

For the social network characteristics of each session, not only the types of social network characteristics recorded in the previously mentioned Chinese patent publication CN101686444A but also some new types of social network characteristics are included, some of which are listed as follows:

Indegree of a central node, representing the number of short messages received by the central node number in the session;

Outdegree of a central node, representing the number of short messages sent by the central node number in the session;

Ratio of the indegree to the outdegree of a central node, representing a ratio of the number of short messages received to the number of short messages sent by the central node number in the session;

Ratio of bidirectional edges among all edges connecting a central node, representing a ratio of having received short messages from the central node number and replying the short messages to the central node number in the session (without relationship in time sequence between sending and receiving), in other words, a reply ratio.

Average weight of all edges connecting a central node, representing an average number of short messages sent or received by the central node number for each direct contact (the number in direct contact with the central node number in the session) in the session;

Largest weight among all edges connecting a central node, representing the largest number of short messages sent or received from the central node number to all direct contacts (its meaning is the same as above) in the session;

Variance of weights of all edges connecting a central node, representing the difference distribution degree of the number of short messages sent or received by the central node number for each direct contact (its meaning is the same as above) in the session;

Number of edges between all direct contact nodes of a central node, representing a number of short messages sent or received each other between direct contacts (its meaning is the same as above) of the central node number in the session;

Average weight of edges between all direct contact nodes of a central node, representing a average number of short messages sent or received each other between direct contacts (its meaning is the same as above) of the central node number in the session;

Sum of weights of edges between all direct contact nodes of a central node, representing the total number of short messages sent or received each other between direct contacts (its meaning is the same as above) of the central node number in the session;

Ratio of the number of the bidirectional edges whose weights are larger than 2 among all bidirectional edges connecting a central node to the number of all outgoing edges, i.e., partner ratio; and Ratio of the number of edges actually existing between all contact nodes, to which a central node sends directly, to the total number of edges of a complete diagram configured by said nodes, i.e., clustering coefficient. The clustering coefficient is usually calculated in a history social network of the user. The history social network of one user is a directional diagram configured by all short message records between the user (i.e., a central node) and all direct contacts of the user within a certain time (e.g., one month) before a set observation point. The clustering coefficient may be calculated on the diagram.

In addition, in an improved implementation, it is possible to further calculate some characteristics held after the division of sessions. For example, it is possible to obtain a characteristic of coincidence degree by performing an "intersecting" operation on the social networks of two adjacent sessions, characterized by a formulation as: {a list of direct contacts in session i}∩{a list of direct contacts in session i−1}/{the number of direct contacts in session i and session i−1}, which means a ratio of the number of the same direct contacts of the user in the two sessions to the number of the direct contacts in the two sessions, and may be a coincidence degree of Si and several sessions Si−1, . . . , Si−j, i.e. the coincidence of social networks between sessions.

In particular, since division of sessions is performed in the invention, it is possible to build a characteristic sequence of social network characteristic values, which will be described in more detail later in the step of determining a spammer.

At block 2003 of FIG. 2, it is determined whether or not the user is a spammer based on the social network characteristic.

The determination result may be a definite decision, that is, a conclusion of "yes" or "no" is given. Alternatively, the determination result may be a probability decision, that is, the probability that the user is a spammer is given. The specific determination result may have several options as follows:

First, a definite or probability decision is initially made to the behaviors of respective sessions according to the social network characteristic, and then a definite or probability determination is given on whether the sender is a spammer or not based on the result of the decision.

A determination is performed according to a least one characteristic of each session, which may be a general characteristic as well as a specific characteristic after the division of sessions. In one embodiment, it is possible to determine whether the attribute of each session is normal short message or suspicious spam by performing categorization by a categorizer constructed by a known sample characteristic using a machine learning method. Taking a characteristic of coincidence degree as an example, the coincidence degree for a normal user has a relatively large value, which reflects the social network of a normal user is relatively stable. However, the coincidence degree for a spam user has a relatively small value, which reflects the coincidence of the social network of a spammer is very small and most of the short messages are sent to varying strangers. It is assumed that a threshold of 0.4 (normal if larger than this value, and suspicious spam if smaller than this value) is obtained by a selected categorization model training. If the number of sessions whose coincidence degree is smaller than 0.4 exceeds a set ratio, for example 80%, then a spammer determination may be made.

Therefore, when determining whether the sender is a spammer or not based on the result of the decision, it is possible to make a determination by statistically analyzing the determination results on respective sessions. For example, the number or the ratio of suspicious spam sessions finally determines whether the user is a spammer or a normal user. For example, when there is one spamming session, it is determined that the user is a spammer. Such a determination approach can make a determination on a hybrid sending behavior to some extent; however, it is still easy to make a misjudgment. Therefore, in an improved embodiment, it is possible to gather the results of respective sessions to make a final decision. For example, a determination is made according to the ratio of the number of spamming behavior sessions, and then the user is considered to be a spammer.

Second, a determination on whether the user is a spammer or a legal user is performed based on the rule of a model by applying social network characteristics evolving with time.

In order to apply the social network characteristics evolving with time, it is possible to select all or part of sessions of each user to constitute a session sequence $\{S_1, \ldots S_i, \ldots S_n\}$ in a continuous time period, and then construct a characteristic sequence $V\{V_1, \ldots V_i, \ldots V_n\}$, wherein $V_i$ is one or a plurality of social network characteristics of the $i^{th}$ session $S_i$, and in the case of a plurality of characteristics, it is possible to construct a plurality of groups of characteristic vectors. For example, it is possible to construct a characteristic sequence $V_1\{V_{11}, \ldots V_{1i}, \ldots V_{1n}\}$ according to the coincidence degree between the telecommunication social network of each session and the telecommunication social network of previous several sessions. It is also possible to construct a characteristic sequence $V_2\{V_{21}, \ldots V_{2i}, \ldots V_{2n}\}$ according to one or more of characteristics such as reply ratio, clustering coefficient, partner ratio, outdegree, and indegree, etc. The characteristics $V_1$ and $V_2$ can be used in combination or separately.

Then, a user aware of the determination result is selected as a known sample F', and a user to be determined is taken as a sample to be determined F. A characteristic sequence V' is constructed for the known sample F', and a comparison between the characteristic sequence V of the user to be determined and the characteristic sequence V' of the known user is made for the characteristic sequence of the user to be determined F with respect to the characteristic changing trend between characteristic values and each time point. In one embodiment, it is possible to use a categorization method of machine learning to find a sample or a sample group which is closest with respect to the characteristic changing trend (characteristic sequence) between characteristics and each time point, and finally determine whether the sample belongs to a spammer or a normal user. It is possible to use a method of distance measurement to detect the similarity of characteristic sequences. There are several kinds of corresponding methods of distance measurement, which, however, are not the point of the present invention.

For example, in an exemplary embodiment, for the sample to be determined F and the known sample F', the characteristic sequence V has t sessions in total each of which takes k characteristics, and a distance function can be defined as $\Sigma k \Sigma t \mathrm{Dist}(Fk, t; F'k, t)$. In a further exemplary embodiment, if $\mathrm{Dist}(Fk, t; Fk, t-1)$ is larger than a set threshold, it is recorded as one jump of the sequence trend, and subtraction is performed between the jump times and the jump times of the known sample F' to obtain the absolute value, which can be taken as another distance measurement. By constructing the distances between the sample to be determined and all the known samples, it is possible to perform decision categorization by a categorization method in any kind of machine learning, such as neural network, decision tree, support vector machine and so on. The output of the categorization is the final probability, i.e., spam short message suspicion probability, and may also be a boolean result of 0 (it is the sending number of spam short messages)/1 (it is not the sending number of spam short messages).

Figure 3:
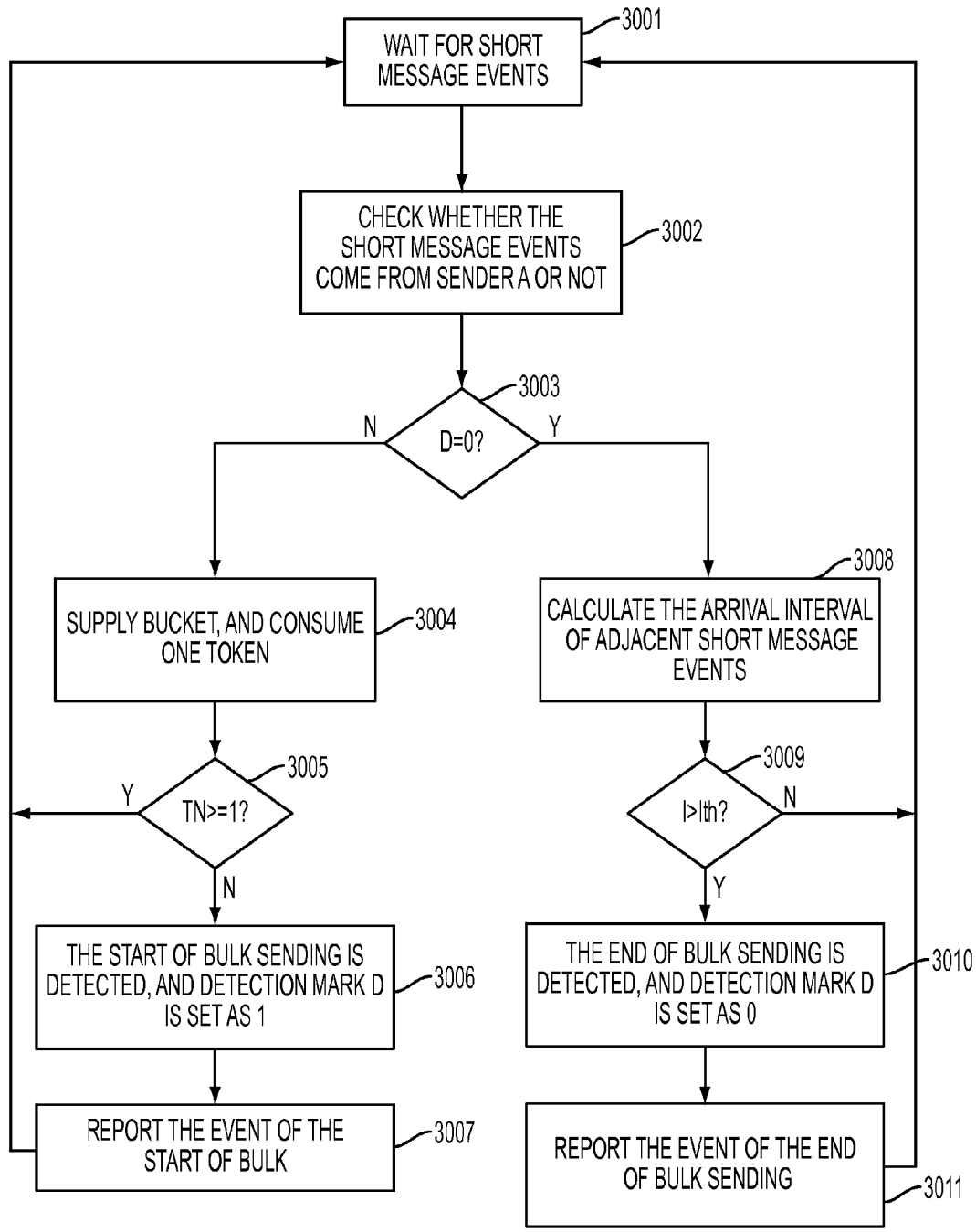
FIG. 3 schematically shows detecting a bulk session by using a token bucket according to an embodiment.

FIG. 3 shows one embodiment of using token bucket to detect bulk sessions in the above described block 2002. Exemplary operations in this embodiment include: sampling short message events sent from the user to different receivers into a token bucket with a size of p; in response to the arrival of the short message events, supplying the token bucket with an increment T, and then consuming a predetermined number of tokens, wherein the increment T is the product of the time interval between two consecutive short message events and the preset rate r; when the available number of the tokens is smaller than 1, considering that the rate of sending short messages by the user exceeds the preset rate r; when it is determined that the rate of sending short messages is smaller than the preset rate r based on consecutive several pieces of the sampled short message events, considering the rate of sending short messages by the user lower than the preset rate r.

More specifically, the detection flow depicted in FIG. 3 includes waiting, in block 3001, for the arrival of a short message event, and if it is received, proceeding to block 3002 by categorizing the short message according to the sender recorded in the short message event. If the sender is sender A, the flow proceeds to block 3003 for checking the detection mark D for bulk session (D is initialized as 0), and if D is not equal to 0, proceeding to block 3004 (a branch of detecting the start point of bulk sending), while if D is equal to 0, proceeding to block 3008 (a branch of detecting the end point of bulk sending).

In block 3004, the token bucket is supplied, and one token is consumed. In block 3005, the number TN of available tokens is checked, and if the number is larger than or equal to 1, the message is considered as a normal short message and the flow returns back to block 3001. On the other hand, if the number of tokens is smaller than 1, the flow proceeds to block 3006 in which the start of bulk sending is detected, and the detection mark D is set as 1. Proceeding to block 3007, the event of the start of bulk sending is reported and the flow returns back to 3001 to further detect the end point.

If on the other hand D is equal to 0 at block 3003, the flow proceeds to block 3008 to calculate the arrival interval, i.e., time slot length between current information and immediately previous information. In block 3009, if the interval I is larger than the arrival interval threshold Ith, the end of bulk sending is detected at block 3010. If not, the flow returns back to block 3001.

In block 3009, it is also possible to sample more than two consecutive short messages, and when the message arrival interval reflects that the rate of sending short messages is smaller than the preset rate r (for example, an interval of 5 minutes represents the corresponding rate is 1 piece/5 minutes), it is considered that the rate of sending short messages by the user is lower than the preset rate r, and thus one bulk session is obtained by division.

Following block 3010, in which the end of bulk sending is detected, and setting the detection mark as 0, the flow proceeds to block 3011 for reporting the event of the end of bulk sending (a bulk session is detected), and returning back to block 3001 to detect next bulk session.

The short message events sent to different receivers from the user are sampled to a token bucket. Each bucket has a size limitation, and when the number of tokens exceeds the size of a bucket, the number will not be increased any more. The tokens are consumed when short message events arrive, and when the number of tokens is smaller than 1, an event that a predetermined traffic rate is exceeded is detected.

Although a token bucket algorithm is mentioned in this embodiment, the algorithm is usually used for traffic shaping or rate limiting in a network world, directed mainly at controlling the rate of data injected into the network and smoothing the burst traffic in the network. The "token bucket algorithm" allows burst transmission to some extent, in addition to being able to limit the average transmission data of the data. In the "token bucket algorithm", as long as there are tokens in the bucket, burst data transmission is allowed until the threshold configured by the user is reached; therefore, it is suitable for traffic with burst characteristic. In the present embodiment, obviously, it is not for shaping, but for detecting burst traffic, as a result, its application manner is contrary to the purpose of the existing token bucket algorithm.

Figure 4:
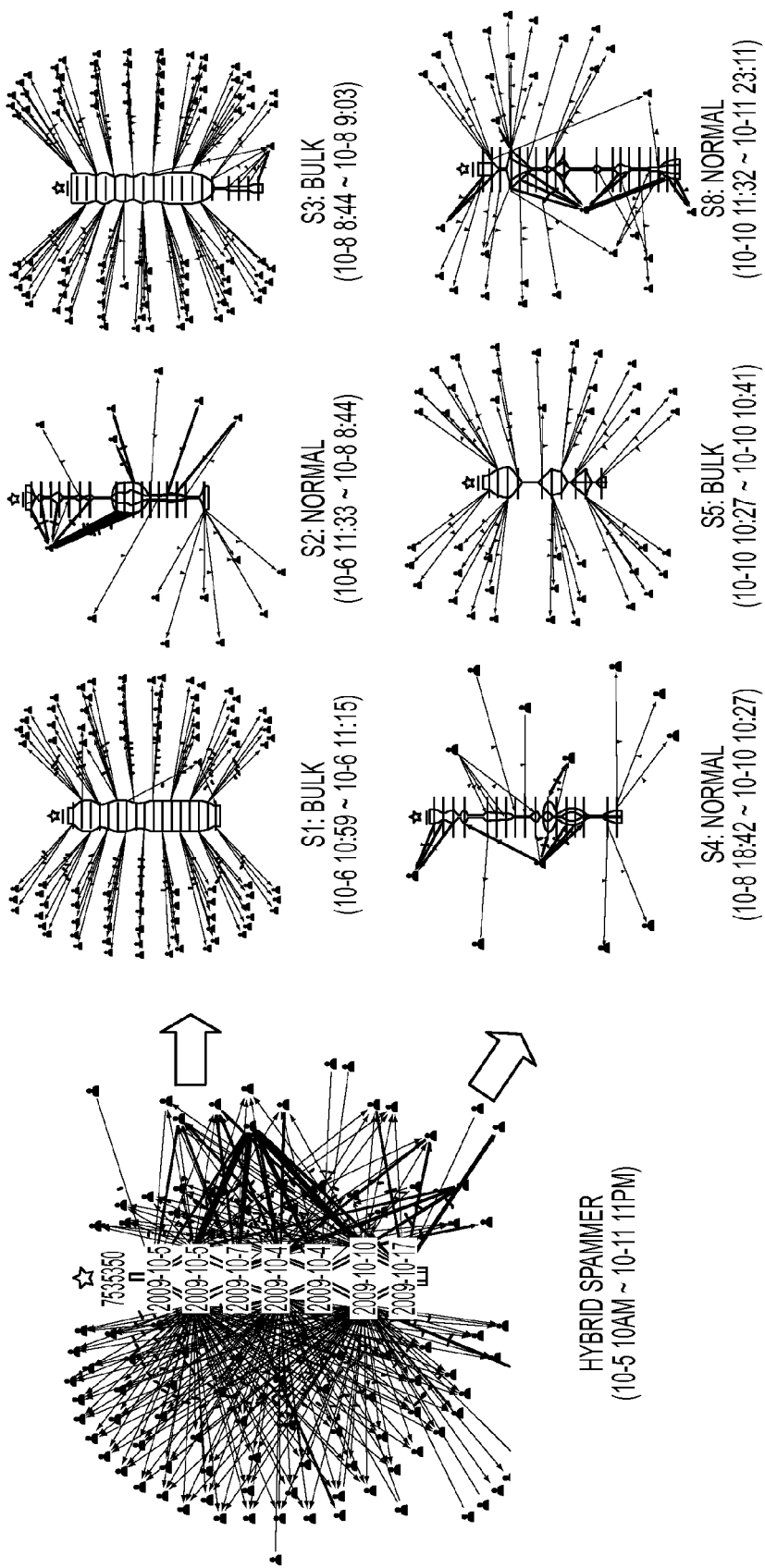
FIG. 4 schematically shows a session division for spammers with hybrid behaviors.

As an alternative implementation in FIG. 4, one embodiment of detecting a bulk session by using a sliding window in block 2002 is further disclosed, in particular including: sampling short message events sent to different receivers by the user to a sliding window with a size of m; when the time interval between the first short message event and the $m^{th}$ short message event in the sliding window is smaller than m/r, considering the rate of sending short messages by the user exceeds the preset rate r; when it is determined that the rate of sending short message is smaller than the preset rate r according to several consecutive pieces of the sampled short message events, considering the rate of sending short messages by the user is lower than the preset rate r.

Further, in an exemplary embodiment, the preset rate r=1 piece/minute, and the sliding window can be set according to the preset rate. The larger the window, the more accurately the average rate of sending short messages can be reflected. For example, when it is reflected that "ten short messages are sent to different receivers within ten minutes", for each user, one sliding window includes ten consecutive short messages sent to different receivers. There is a size limitation for each sliding window, and when the number of tokens exceeds the size of the sliding window, the number will not be increased any more. When the time interval between the first short message and the tenth short message is smaller than or equal to 10 minutes, it is considered that the rate of sending short messages by the user exceeds the preset rate r=1 piece/minute. Then, at least two consecutive short messages can be sampled, and the interval with which the messages sent subsequently by the user arrive at the sliding window is calculated. When the message arrival interval reflects that the rate of sending short messages is smaller than the preset rate r (for example, an interval of 5 minutes represents the corresponding rate will be 1 piece/5 minutes), the rate of sending short messages by the user is considered to be lower than the preset rate r, and thus one bulk session is obtained by division.

With bulk sessions being detected, a normal session may be created between two consecutive bulk sessions. When there are a small number of different information receivers, a normal session can be neglected, for example, when the number of different information receivers is smaller than 4.

Combing the above described two embodiments of detecting bulk sessions, it can be predicted reasonably by those skilled in the art that: in the detection of the start of a bulk session, the larger the sizes of the sliding window and the token bucket, the more accurately the average rate of sending short messages by the user can be reflected, and the smaller the sizes, the more accurately the instantaneous rate of sending short messages by the user can be reflected; in the detection of the end of a bulk session, the larger the number of the sampled consecutive short messages, the more accurately the average rate of sending short messages by the user can be reflected, and the smaller the number, the more accurately the instantaneous rate of sending short messages by the user can be reflected. Moreover, when performing a comparison with the preset rate r, if a condition that the rate is larger or smaller than the preset rate to some extent is set as the comparison standard (for example, the time interval between two adjacent short message events exceeds 5 minutes, which reflects the extent to which the rate of sending short messages by the user is lower than the preset rate r=5), the implementation of the technical solutions of the present application is not affected as well. Those skilled in the art may set the sliding window and the token bucket according to the preset rate r and actual requirements.

Figure 5:
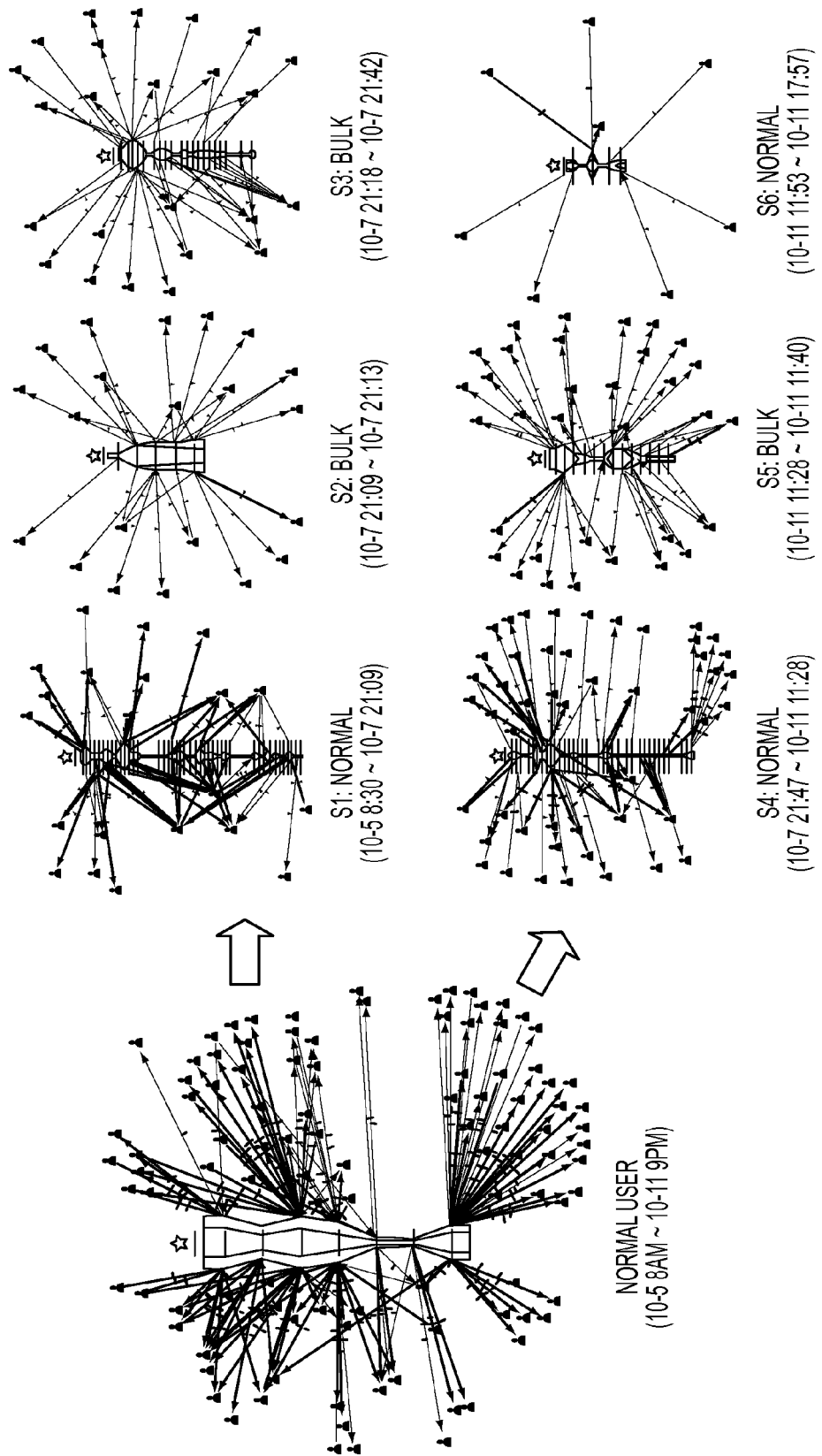
FIG. 5 schematically shows a session division for normal users.
Figure 6:
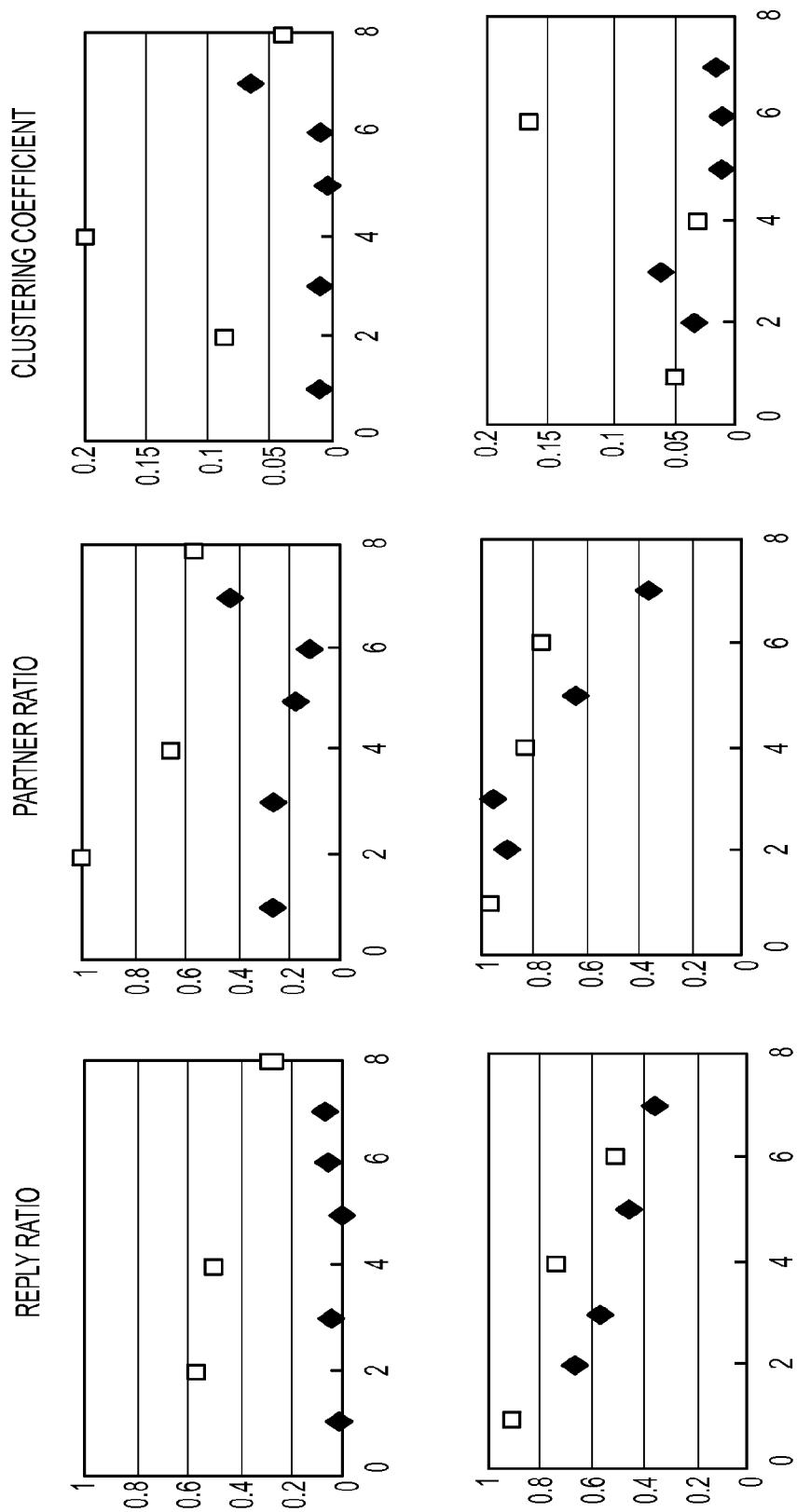
FIG. 6 schematically shows examples of three types of social network characteristics.

FIGS. 4, 5, and 6 are schematic diagrams for obtaining sessions by division, creating social networks, and calculating social networks according to the embodiments as described above.

FIGS. 4 and 5 illustrate short message events from 10 am, October 5 to 11 pm, October 11, in which S1~S8 are respective sessions obtained by division, respectively. In particular, FIG. 4 shows a schematic diagram of division for a spammer with hybrid behaviors. The regions of the central parts of social networks in the figures all represent central node users shown by pentacles, which is only for the sake of convenience for drawing schematic diagrams and avoiding too dense lines which would influence readability of the figures. FIG. 5 shows a schematic diagram after division for a user with a normal sending behavior. The sessions can be continuous in time, or part of normal sessions with fewer short messages can also be omitted, which makes the session discontinuous in time.

FIG. 6 illustratively provides schematic diagrams of three types of social network characteristics. The upper ones are characteristic schematics of user 1, and the lower ones are characteristics of user 2, wherein, bulk sessions are represented by diamonds and normal sessions are represented by squares. FIG. 6 illustratively provides schematic diagrams of the three characteristics, that is, reply ratio, partner ratio and clustering coefficient, evolving with sessions. Of course, those skilled in the art can also obtain schematic diagrams for involvement of other characteristics. Thereby, spammers with hybrid behaviors can be discriminated.

As illustrated in FIG. 6, bulk sessions of user 1 have relatively low reply ratios, partner ratios, as well as clustering coefficients of history networks. In contrast, in normal sessions, the three characteristics all have relatively large numerical values. It is possible to determine user 1 is a spammer with hybrid behaviors based on the above characteristics individually or in combination.

Bulk sessions of user 2 have relatively high reply ratios, partner ratios, as well as clustering coefficients of history networks. In contrast, in normal sessions, the three characteristics have relatively large numerical values as well. It is possible to determine user 2 is a normal short message sender based on the above characteristics individually or in combination.

A computer system for determining a spammer according to exemplary embodiments has been described above with reference to the drawings. It should be noted that the above description is exemplary only and not limiting of. In other embodiments, the method can have more, less or different modules, and the relationships of connection, comprising, and function, etc. between respective modules can be different with those described and illustrated.

The embodiments can be implemented in a manner of hardware, software, or a combination of hardware and software. The embodiments can be implemented in one computer system in a centralized manner, or in a distributed manner in which different parts are distributed in several computer systems interconnected. Any computer systems or other apparatuses suitable to perform the method described herein are appropriate. A typical combination of hardware and software may be a general computer system with computer programs which, when loaded and executed, control the computer system to perform the method of the invention and to configure the apparatus of the invention. The embodiments can also be embodied in a computer program product which includes all features enabling the implementation of the method described herein and is able to perform the method when loaded into a computer system.

The invention claimed is:

1. A system for determining a spammer, comprising:
a session division apparatus configured to acquire short message events associated with a user and divide them into a plurality of sessions in terms of time, wherein division into a plurality of sessions comprises division into bulk sessions and normal sessions according to a sending behavior of the user, wherein, the bulk session is the duration of a behavior of sending short messages in bulk by the user, and the normal session is the duration of a behavior of sending short messages normally by the user, the division comprising in response to the rate of sending short messages by the user exceeding a preset rate r, marking the start of the bulk session, and in response to the rate of sending short messages by the user being lower than the preset rate r, marking the end of the bulk session, wherein the normal session is a partial period of the adjacent bulk sessions;
a social network building and characteristic calculating apparatus configured to build a social network of the user in each of the sessions, and calculate at least one type of social network characteristic in each of the sessions, respectively; and
a determination apparatus configured to determine whether the user is a spammer or not according to the social network characteristic by sampling the short message events sent to different receivers by the user to a token bucket;
in response to arrivals of the short message events, supplying the token bucket with an increment T, and then consuming a predetermined number of tokens, wherein the increment T is the product of the time interval between two consecutive pieces of said short message events and the preset rate r;
when the number of available tokens is smaller than 1, determining that the rate of sending short messages by the user exceeds the preset rate r;
when it is determined that the rate of sending short messages is smaller than the preset rate r according to several consecutive pieces of the sampled short message events, determining that the rate of sending short messages by the user is lower than the preset rate r.

2. The system according to claim 1, further comprising:
an apparatus configured to sample the short message events sent to different receivers by the user to a sliding window with a size of m;
an apparatus configured to, when the time interval between the first short message event and the mth short message event of the sliding window is smaller than m/r, consider that the rate of sending short messages by the user exceeds the preset rate r; and
an apparatus configured to, when it is determined that the rate of sending short messages is smaller than the preset rate r according to several consecutive pieces of the sampled short message events, consider that the rate of sending short messages by the user is lower than the preset rate r.

3. The system according to claim 1, wherein the social network characteristics include a coincidence ratio which is the ratio of the number of direct contacts common to a plurality of sessions to the number of direct contacts of the plurality of sessions.

4. The system according to claim 1, wherein the determination apparatus is configured to:
   make a decision on whether the respective sessions involve a spamming behavior or not according to at least one type of the social network characteristics; and
   statistically analyze the decision results for the respective sessions and determine whether the user is a spammer or not.

5. The system according to claim 1, wherein the determination apparatus is configured to:
   select at least one type of the social network characteristics of the plurality of sessions to configure a characteristic sequence of the user; and
   compare the characteristic sequence of the user with characteristic sequences of known samples, and determine whether the user is a spammer or not according to the closest known sample, the known samples being users known to be a spammer or not.

* * * * *